(12) United States Patent
Barghoorn et al.

(10) Patent No.: US 6,525,172 B1
(45) Date of Patent: Feb. 25, 2003

(54) DRYING OF COAGULATED WATER-CONTAINING RUBBER PARTICLES

(75) Inventors: Peter Barghoorn, Kallstadt (DE); Rainer Klostermann, Ketsch (DE); Guiscard Glück, Mainz (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/913,541

(22) PCT Filed: Feb. 8, 2000

(86) PCT No.: PCT/EP00/00992

§ 371 (c)(1), (2), (4) Date: Aug. 15, 2001

(87) PCT Pub. No.: WO00/49053

PCT Pub. Date: Aug. 24, 2000

(30) Foreign Application Priority Data

Feb. 19, 1999 (DE) .......................................... 199 07 136

(51) Int. Cl.⁷ .................................................. C08F 6/00
(52) U.S. Cl. ........................ 528/499; 528/487; 528/502
(58) Field of Search ................................. 528/487, 499, 528/502

(56) References Cited

U.S. PATENT DOCUMENTS

| | | | | | |
|---|---|---|---|---|---|
| 2,378,732 A | * | 6/1945 | Semon et al. | ......... | 159/DIG. 10 |
| 4,897,462 A | * | 1/1990 | Yusa et al. | .................. | 523/352 |
| 5,514,772 A | * | 5/1996 | Suzuki et al. | ................ | 523/352 |

* cited by examiner

*Primary Examiner*—Terressa M. Boykin
(74) *Attorney, Agent, or Firm*—Keil & Weinkauf

(57) ABSTRACT

The invention relates to a process for the drying of coagulated water-containing rubber particles. These are treated with an aqueous solution of any desired substances in monodisperse solution in water in such a way that, at least for some period, the surface of the rubber particles is completely covered by the aqueous solution. It is preferable to use an aqueous solution of substances selected from the group consisting of salts, alcohols, acids and sugars. This method can reduce the internal water content between the particles resulting from coagulation, without major usage of energy or time.

9 Claims, 1 Drawing Sheet

DRYING OF COAGULATED WATER-CONTAINING RUBBER PARTICLES

The invention relates to a process for the drying of coagulated water-containing rubber particles, in particular graft rubber particles.

Rubbers, or graft rubbers, are frequently prepared by homo- or copolymerization of the appropriate monomers in a liquid medium, using emulsion polymerization, miniemulsion polymerization, or microsuspension polymerization. The form in which the rubber is produced here is mostly that of an aqueous solids dispersion, from which the rubber has to be isolated if the dispersion is not intended for use as such. The isolation of the rubber from the dispersion usually takes place by coagulation. Many different processes are known for this purpose. A common feature of these processes is that the residual water then has to be removed from the coagulated particles. This mostly takes place in two or more steps. A first step separates the coagulated particles from the surface water by centrifuging, or removal by way of pressing, squeezing or filtration. The residual water included between the coagulated particles remains, and often represents more than 50% in the case of coagulated rubbers. Removal of this residual water can be achieved only by increasing the use of energy, and there is therefore mostly a subsequent drying step using heat, if desired combined with reduced pressure. This drying step is energy-intensive and time-consuming, since the particles have to be dried from the outside to the inside.

It is an object of the present invention, therefore, to provide a process which can dry water-containing rubber particles coagulated from the appropriate dispersions, and which can reduce the internal water content present between the particles and resulting from the coagulation process, without any major use of energy or time.

We have found that this object is achieved by a process in which the rubber particles are treated with an aqueous solution of any desired substances in monodisperse solution in water in such a way that, for at least some period, the surface of the rubber particles is entirely covered by the aqueous solution.

DE-A-196 47 599 has disclosed a process in which included residual water from, for example, suspension-polymerized styrene particles is removed by treating the styrene particles with an aqueous salt solution. This process can be carried out at from 20 to 105° C. It differs fundamentally from the process claimed here, since it removes internal or residual water from the styrene particles themselves, whereas this specification concerns residual water included between the rubber particles during their coagulation. The styrene particles, furthermore, are hard thermoplastics with a Tg of about 100° C., with internal water contents much lower than those of coagulated rubber particles. The residual water contents within the styrene particles are generally about 2% by weight, or, if they are very high, in the range somewhat above 5% by weight. In contrast, the residual water contents of the elastomeric rubber particles are above 20% by weight and may be up to 50% by weight or more.

Surprisingly, during development of the process of the invention in the field of rubber particles, it has been found that besides using treatment with aqueous salt solutions to reduce the residual water content it is also possible to use aqueous solutions of any desired substances, with the proviso that the substances are present in monodisperse solution in the aqueous solution. For the purposes of the present invention, substances present in monodisperse solution in water are substances which give a "genuine solution" with water.

Use is preferably made of an aqueous solution of substances selected from the group consisting of salts, alcohols, acids and sugars. Suitable salts here are those of inorganic acids, and salts derived from metals of the 1st to 3rd main group, of the 4th main group, except C and Si, of the 5th main group, except N and P, Ne and Ar of the noble gases, or else of the 1st to 7th transition group, i.e. halides, sulfates, nitrates, phosphates, or carbonates, in particular NaCl, $MgSO_4$, $(NH_4)_2SO_4$, $Al_2(SO_4)_3$, $FeCl_3$, $CaCl_2$, $CoCl_2$, $MgCl_2$, $H_2SO_4$, $BaCl_2$, HCl, LiCl, $K_2SO_4$, $HNO_3$, $K_2CrO_4$, NaBr, KOH, $Na_2SO_4$, $NH_4Cl$, NaCl, NaOH, $H_3PO_4$, sucrose, KCl, KBr, CsCl, $KHCO_3$, isopropanol, $CH_2OHCH_2OH$, ethanol, D-glucose, $Pb(NO_3)_2$, D-fructose, $CdCl_2$, $MnSO_4$, $CdSO_4$, $CH_3OH$, $NH_3/NH_4OH$, $NiSO_4$, $CH_3COCH_3$, $CH_3COOH$, $CuSO_4$, $NH_2CONH_2$ and HCOOH. Particularly suitable salts are NaCl, $MgSO_4$, $(NH_4)_2SO_4$, $Al_2(SO_4)_3$, $FeCl_3$ and KCl.

The concentration of the aqueous solution may be from 5% by weight to saturation, but preferably from 15 to 40% by weight, based in each case on the finished solution. At concentrations below 5% by weight, the time for drying has been found to be too long, while at excessively high concentrations there is a risk of salt precipitation if salt solutions are used. A general rule is that the drying of the rubber particles proceeds more rapidly as the concentration of the dissolved substance rises and as the temperature increases. According to the invention, the temperature here may be from about 20 to 200° C. Especially at elevated temperatures above 50° C., it should be noted that operations should be carried out at elevated pressure, and therefore in sealed vessels. The pressure here may rise to about 20 bar or higher. However, operations at low temperatures and lower pressures may be carried out using open vessels.

One preferred embodiment of the process of the invention begins by sintering the rubber particles after they have been coagulated. This agglomerates the coagulated particles and further enlarges them. The treatment with the aqueous solution is then carried out after this sintering.

The process of the invention may be carried out either continuously or batchwise, in various ways. An example of a batch procedure is one using stirred vessels. However, vessels with other mixing methods can also be used, the coagulated particles being introduced into these and mixed with the aqueous solution. It is necessary here that the polymer particles and the aqueous solution of the invention are kept in constant motion.

Particularly if the process is carried out continuously, an example of a form in which the particles are used is that of a solid packing introduced into a vertical tube. The aqueous solution of the invention is fed, for example applied by spraying, within the upper region of the tube. This solution then moves downward under gravity, or by pumping or pressure, wetting the particles. It can be collected at a lower point and, where appropriate, be reused for spraying after its concentration has been raised.

In another version of the execution of the process of the invention, both the rubber particles and the aqueous solution pass through the tube. Gravity alone may be sufficient for this purpose. The rubber particles may then be removed continuously from the lower region of the tube, for example of a tube in the form of a column. However, it is also possible for the rubber particles and the aqueous solution to be conducted in countercurrent to one another.

It is also possible for the rubber particles and the aqueous solution to be introduced into an essentially horizontal tube and to be mixed by way of at least one conveying screw, and transported through the tube. The single screw channel of the conveying screw can prevent blocking of the apparatus and at the same time provide narrow residence time distribution for the particles, giving uniform drying. Since the aqueous solution of the invention floods all of the screw channels in an arrangement of this type, there is certain to be wetting of all of the rubber particles, and this, too, is important for uniform drying.

Once the rubber particles have been treated with the aqueous solution of the invention, the particles may be washed with water until there are no longer any detectable residues of the substances dissolved in the aqueous solution.

The composition of water-containing rubber particles which are treated by the process of the invention may be:

from 60 to 100 parts by weight, based on the total weight of the finished dispersion, of at least one monomer (main monomer) capable of incorporation into a polymer, from 0 to 35 parts by weight, preferably from 0 to 20 parts by weight, of at least one functional monomer (comonomer), from 0 to 5 parts by weight, preferably from 0 to 3 parts by weight, of an $\alpha,\beta$-unsaturated mono- or dicarboxylic acid, and from 0 to 10 parts by weight of a polyfunctional crosslinking monomer, as described by way of example in DE-A-40 05 210, in lines 19-27 on page 3.

The main monomer may have been selected from:

esters of monoethylenically $\alpha,\beta$-unsaturated mono- or dicarboxylic acids preferably having from 3 to 6 carbon atoms, for example acrylic acid, methacrylic acid, maleic acid, fumaric acid or itaconic acid, with generally $C_1$-$C_{12}$, preferably $C_1$-$C_8$, and in particular $C_1$-$C_4$ alkanols.

Particular esters of this type are methyl, ethyl, n-butyl, isobutyl, tert-butyl and 2-ethylhexyl acrylate, and the corresponding methacrylates;

vinylaromatic compounds, such as styrene, oc-methylstyrene, $\alpha$-chlorostyrene, or vinyltoluenes;

vinyl esters of $C_1$-$C_{18}$ mono- or dicarboxylic acids, for example vinyl acetate, vinyl propionate, vinyl n-butyrate, vinyl laurate, or vinyl stearate;

butadiene.

Particularly preferred main monomers are methyl methacrylate, methyl acrylate, n-butyl methacrylate, tert-butyl methacrylate, ethyl acrylate, n-butyl acrylate, 2-ethylhexyl acrylate, styrene, vinyl acetate, acrylonitrile and butadiene.

Particularly suitable comonomers are:

linear 1-olefins, branched-chain 1-olefins, or cyclic olefins, e.g. ethene, propene, butene, isobutene, pentene, cyclopentene, hexene, cyclohexene, octene, 2,4,4-trimethyl-1-pentene, where appropriate in a mixture with 2,4,4-trimethyl-2-pentene, $C_8$-$C_{10}$ olefin, 1-dodecene, $C_{12}$-$C_{14}$ olefin, octadecene, 1-eicosene ($C_{20}$), $C_{20}$-$C_{24}$-olefin; oligoolefins prepared by metallocene catalysis and having a terminal double bond, e.g. oligopropene, oligohexene, or oligooctadecene; olefins having a high $\alpha$-olefin content and prepared by cationic polymerization, e.g. polyisobutene. However, it is preferable that there is no copolymerization of ethene into the polymer, or of any linear 1-olefin into the polymer.

Methacrylonitrile.

Vinyl or allyl alkyl ethers having from 1 to 40 carbon atoms in the alkyl radical, where the alkyl radical may also bear other substituents, such as a hydroxyl group, or an amino or dialkylamino group, or one or more alkoxylate groups, e.g. methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino) ethyl vinyl ether, methyldiglycol vinyl ether, and also the corresponding allyl ethers, and mixtures of these.

Acrylamides and alkyl-substituted acrylamides, e.g. acrylamide, methylacrylamide, N-tert-butylacrylamide, N-methyl(meth)acrylamide.

Monomers containing sulfo groups, e.g. allylsulfonic acid, methallylsulfonic acid, styrenesulfonate, vinylsulfonic acid, allyloxybenzenesulfonic acid, 2-acrylamido-2-methylpropanesulfonic acid, and the corresponding alkali metal salts or ammonium salts, and mixtures of these, and also sulfopropyl acrylate, sulfopropyl methacrylate.

$C_1$-$C_4$-hydroxyalkyl esters of $C_3$-$C_6$ mono- or dicarboxylic acids (see above), in particular of acrylic acid, methacrylic acid or maleic acid, or their derivatives alkylated with from 2 to 50 mol of ethylene oxide, of propylene oxide, of butylene oxide, or of mixtures of these, and esters, with the acids mentioned, of $C_1$-$C_{18}$ alcohols alkoxylated with from 2 to 50 mol of ethylene oxide, of propylene oxide, of butylene oxide, or of mixtures of these, e.g. hydroxyethyl (meth)acrylate, hydroxypropyl (meth)acrylate, 1,4-butanediol monoacrylate, ethyl diglycol acrylate, methylpolyglycol acrylate (11 EO), and (meth)acrylic esters of $C_{13}$/$C_{15}$, oxo alcohol reacted with 3, 5, 7, 10 or 30 mol of ethylene oxide, and mixtures of these.

Vinylphosphonic acid, dimethyl vinylphosphonate, and other phosphorus-containing monomers.

Alkylaminoalkyl (meth)acrylates and alkylaminoalkyl (meth)acrylamides, or quaternization products of these, e.g. 2-(N,N-dimethylamino)ethyl (meth)acrylate, 3-(N,N-dimethylamino)propyl (meth)acrylate, 2-(N,N,N-trimethylammonium)ethyl (meth)acrylate chloride, 2-dimethylaminoethyl aminoethyl(methyl)acrylamide, 3-dimethylaminopropyl(meth)acrylamide, 3-trimethylammoniumpropyl(meth)acrylamide chloride.

Allyl esters of $C_1$-$C_{30}$ monocarboxylic acids.

N-vinyl compounds, such as N-vinylformamide, N-vinyl-N-methylformamide, N-vinylpyrrolidone, N-vinylimidazole, 1-vinyl-2-methylimidazole, 1-vinyl-2-methylimidazoline, N-vinylcaprolactam, vinylcarbazole, 2-vinylpyridine, 4-vinylpyridine.

Diallyldimethylammonium chloride, vinylidene chloride, vinyl chloride, acrolein, methacrolein.

Monomers containing 1,3-diketo groups, e.g. acetoacetoxyethyl (meth)acrylate or diacetoneacrylamide, monomers containing urea groups, e.g. ureidoethyl (meth)acrylate, acrylamidoglycolic acid, methyl methacrylamidoglycolate.

Monomers containing silyl groups, e.g. trimethoxysilylpropyl methacrylate.

Monomers containing glycidyl groups, e.g. glycidyl methacrylate.

The process of the invention may likewise be used for the drying of graft rubber particles prepared by grafting of the elastomers with the monomers for the graft shell, in aqueous emulsion, at least in the final stage of the graft polymerization process.

For the purposes of the present invention, graft rubbers are particularly those graft polymers where monomers forming hard thermoplastics, particularly styrene, acrylonitrile, and/or methyl methacrylate, form a graft shell, grafted onto core particles made from soft rubber, this taking place by way of polymerization or copolymerization of the monomers for the graft shell in the presence of the rubber particles. Soft rubbers which are suitable are elastomeric polymers and/or copolymers with glass transition temperatures below –10° C., preferably below –30° C. Particularly suitable rubbers are elastomeric 1,3-diene homo- or copolymers, such as homo- or copolymers of butadiene, of isoprene, or of chloroprene, preferably butadiene rubber, and also elastomeric acrylate homo- and/or copolymers with the low glass transition temperatures mentioned. The coagulated graft rubbers of the invention are preferably elastomeric acrylate polymers or 1,3-diene homo- or copolymers, for example homo- or copolymers of $C_4$-$C_8$-alkyl acrylates, in particular of n-butyl acrylate and/or 2-ethylhexyl acrylate. Examples of preferred comonomers in the alkyl acrylates are crosslinking monomers having at least two non-conjugated carbon-carbon double bonds, for example diallyl maleate, diallyl phthalate, diacrylates and dimethacrylates of diols, such as 1,4-butanediol or 1,6-hexanediol, etc., and also allyl methacrylate and dihydrodicyclopentadienyl acrylate, these being used particularly in amounts of from 0 to 10% by weight of the total amount of monomers during elastomer preparation, and also polar monomers, such as acrylic acid, methacrylic acid, maleic anhydride, acrylamide, methacrylamide, N-methylolacrylamide, or N-methylolmethacrylamide, and alkyl ethers of these. The proportion of the elastomers in the graft rubber is generally 30 to 85% by weight, and the process of the invention can readily coagulate graft rubbers whose proportion or elastomer is above 30% by weight, based on total solids content.

Suitable monomers for polymerization to apply the graft shell are particularly those monomers, and mixtures of the same, which form hard polymers or copolymers with glass transition temperatures above +50° C. The nature of the monomer(s) here depends substantially on the nature of the thermoplastics which form the polymer matrix after blending with the graft rubber. The graft shell should have some compatibility or affinity with these in order to achieve fme two-phase dispersion of the graft rubbers within the matrix. Particularly suitable and usual monomers are those having from 8 to 12 carbon atoms, for example styrene, α-methylstyrene, and also styrenes and α-methylstyrenes which bear one or more alkyl groups, in particular methyl groups, as substituents on the benzene ring. They may be the sole monomers for preparing the graft shell, or be used in a mixture with other monomers, such as methyl methacrylate, methacrylonitrile, or preferably acrylonitrile, the proportion of the methacrylonitrile monomer units and/or acrylonitrile monomer units in the graft shell being from 0 to 45% by weight, preferably from 10 to 40% by weight, based on the graft shell. Preference is given to mixtures of styrene with from 10 to 40% by weight of acrylonitrile, based on the total amount of monomers. Methacrylates and acrylates should be mentioned as preferred other monomers for preparing the graft shell, and of these preference is given to methyl methacrylate, which may also be used as sole, or quantitatively predominant, monomer for preparing the graft shell. Other suitable comonomers for preparing the graft shell are maleic anhydride, maleimide, N-phenylmaleimide, acrylic acid and methacrylic acid.

Depending on the monomers used for the graft core, the result of blending with a thermoplastic polymer made from styrene and acrylonitrile (SAN) is then a graft polymer of acrylonitrile-butadiene-styrene type (ABS) or of acrylonitrile-styrene-alkyl acrylate type (ASA). These known graft polymers are mentioned purely by way of example, however.

The precise polymerization conditions selected in each case are preferably those which give the resultant graft polymer particles a median particle size, defined by the $d_{50}$ of the particle size distribution, which is usually from 30 to 1000 nm, in particular from 50 to 400 nm.

If bimodal particle size distribution is desired, this may also be achieved by (some degree of) agglomeration of the polymer particles.

It is also possible for the structure of the rubber to have two or more shells, for example as described in WO-A-9623839, EP-A-256 391, EP-A-534 212 and EP-A-535456, the disclosure of which in this respect is incorporated herein by way of reference.

The process of the invention is described below in further detail using the drawing attached and the examples.

BRIEF DESCRIPTION OF THE DRAWINGS

FIG. 1 is a highly simplified diagram of an apparatus which has a vertical tube 1 in the form of a column, a collector 3 for the rubber particles 5 treated with the aqueous solution of the invention, and a removal unit 7 attached to the collector 3. The rubber particles 5 form a solid packing in the tube 1, the upper end of which is at the same time filled with the aqueous solution. Both the rubber particles 5 and the aqueous solution are moved downward by gravity, under their own weight, toward the collector 3, where the aqueous solution can be collected, and its concentration increased, where appropriate, and then reused for treating the rubber particles 5. The advantage of a tube 1 in the form of a column with a packed solid bed is narrow residence time distribution and uniform drying of all the rubber particles 5. In particular, this method eliminates the effect of any difference in buoyancy behavior. On the other hand, for example in the case of bimodal particle size distribution, it is also possible to use the effect of differences in buoyancy of the rubber particles 5 of differing size in order to control the residence time, by suitable conduct of the flow, in such a way that large rubber particles 5, which require longer drying times, indeed have a longer residence time in the tube 1.

In one modification of this embodiment of the apparatus for treating the rubber particles 5, it is only the aqueous solution which trickles through the tube 1, while the rubber particles 5 remain within the tube. This method again brings about uniform wetting of the rubber particles 5, and thus uniform drying. One way of applying the aqueous solution in this version is by spray-application.

Figure 1:
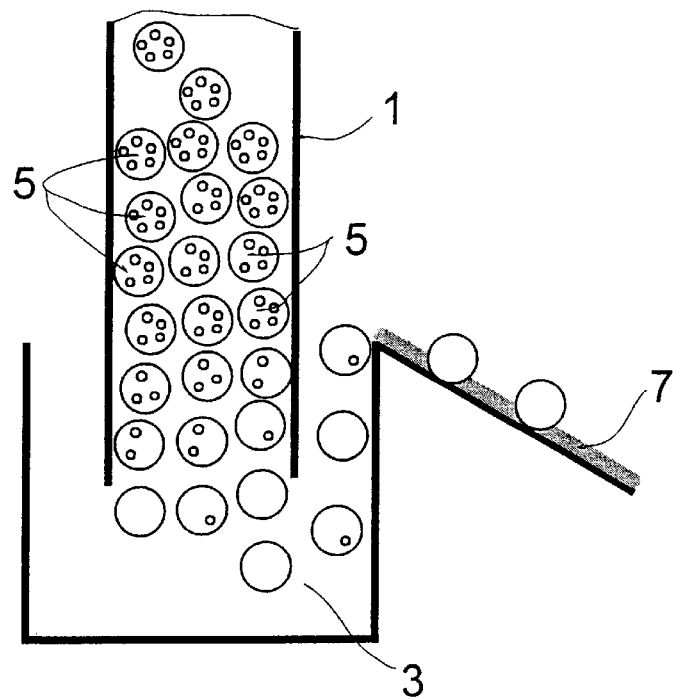
FIG. 1 is a diagram of the continuous execution of the process of the invention in a column.
Figure 2:
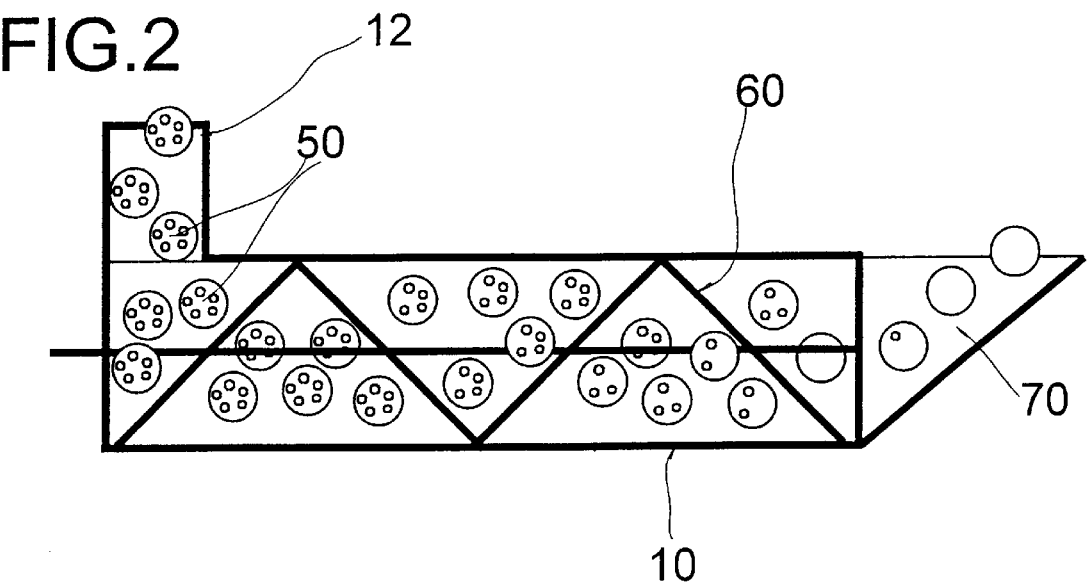
FIG. 2 is a diagram of the continuous execution of the process of the invention in an apparatus with screw conveying.

In FIG. 2, the process of the invention is carried out in an essentially horizontal tube 10, which has a feed 12 for the rubber particles 50 and the aqueous solution. The tube 10 has at least one conveying screw 60, shown highly simplified and diagrammatically in FIG. 2. The conveying screw 60 brings about continuous transport, both of the rubber particles 50 and of the aqueous solution, through the tube 10, and at the same time brings about good mixing of the rubber particles 50 with the aqueous solution. The individual channels of the conveying screw 60 also prevent blocking the apparatus and likewise provide narrow residence time distribution, permitting uniform drying. Since the apparatus ensures that the aqueous solution floods all of the channels, all of the rubber particles 50 are wetted, and their drying is uniform.

EXAMPLES

Examples 1 to 12 below concern acrylonitrile-butadiene-styrene (ABS) rubbers, and Examples 13 and 14 concern acrylonitrile-styrene-acrylate (ASA) rubbers.

Comparative Example 1 a) Preparation of the Base from Polybutadiene

Butadiene was polymerized in aqueous emulsion. The procedure here was as given in Example 1 on page 15 of DE-A-31 49 046. The resultant polybutadiene latex had a solids content of 40% by weight and a median particle size $d_{50}$ of 80 nm.

b) Agglomeration of Polybutadiene Base and Grafting with Styrene-acrylonitrile 50 kg of the polybutadiene latex prepared in stage a) were charged to a reactor with stirrer and thermometer. After heating to 75° C., 1 kg of an agglomerating latex was added, made from 96% by weight of acrylate and 4% by weight of methacrylamide (solids content 10% by weight). This gave a partially agglomerated polybutadiene latex with bimodal particle size distribution, and with a median particle size $d_{50}$ of 220 nm.

0.2 kg of potassium stearate and 0.025 kg of potassium persulfate were added to the agglomerated latex at 75° C. 1.47 kg of styrene and 0.63 kg of acrylonitrile were added, and then the mixture was polymerized for 15 min, followed by addition of a mixture made from 7.35 kg of styrene and 3.15 kg of acrylonitrile within a period of a further 3 hours. 0.025 kg of potassium persulfate was then added and the mixture was stirred at 75° C. for a further 1.5 hours.

c) Graft Precipitation 50 kg of the grafted polybutadiene latex were mixed with 100 kg of a 0.5% strength by weight $MgSO_4$ solution at 80° C.

d) Sintering of Precipitated Graft

The precipitated graft rubber was heated to 120° C. for half an hour and then freed from surface water in a centrifuge (Carl Padberg Zentrifugenbau GmbH) for half an hour at 1600 rpm. The amount of residual moisture in the graft rubber after centrifuging was 29.7% by weight. Residual moisture was determined by drying for 24 hours in vacuo at 60° C.

Examples 2 To 6

The procedure was as described in Comparative Example 1 a) to d). In each case, 5 kg of the resultant sintered graft rubber were then mixed with 20 l of an aqueous NaCl solution (23% by weight). Table 1 gives each of the temperatures used, and the residence time. The rubber was isolated by centrifuging, and excess NaCl was removed by three washes, each with 10 l of water.

The surface water was then removed from the rubber particles by centrifuging at 1600 rpm for half an hour, and residual moisture was determined by drying in vacuo at 60° C. for 24 hours. The results are likewise given in Table 1.

TABLE 1

| Example No. | Residence time in NaCl solution [min] | Temperature [° C.] | Residual moisture after Centrifuging [%] |
|---|---|---|---|
| 1c | — | — | 29.7 |
| 2 | 60 | 60 | 19.2 |
| 3 | 120 | 60 | 18.8 |
| 4 | 60 | 90 | 15.1 |
| 5 | 60 | 110 | 15 |
| 6 | 60 | 150 | 17.4 |

Examples 7 to 10

The procedure was as described in Example 1 a) to d). In each case, 500 g of the resultant graft rubber were stirred into 1 l of a 23% strength by weight NaCl solution in a 2 l glass beaker at 60° C. Each of the residence times is given in Table 2. The graft rubber treated in this way was freed from surface water by filtration using the suction generated by a water jet. Residual moisture was determined by drying for 24 hours in vacuo at 60° C.

TABLE 2

| Example No. | Residence time in NaCl solution [min] | Temperature [° C.] | Residual moisture after filtration [%] |
|---|---|---|---|
| 1c | — | — | 9.8 |
| 7 | 30 | 60 | 9 |
| 8 | 60 | 60 | 4 |
| 9 | 120 | 60 | 3.2 |
| 10 | 180 | 60 | 0.4 |

Examples 11 and 12

The procedure was as described in Comparative Example 1 a) to d). 5 kg of each of the resultant sintered graft rubbers were then mixed with 20 liters of an aqueous $(NH_4)_2SO_4$ solution (33% by weight, Example 11) or with an $MgSO_4$ solution (29% by weight, Example 12). Table 3 gives each of the temperatures used, and the residence time. The rubber was isolated by centrifuging, and excess salt was removed by three washes, each with 10 liters of water.

The surface water was then removed from the rubber particles by centrifuging at 1600 rpm for half an hour, and residual moisture was determined by drying for 24 hours in vacuo at 60° C. The results are given in Table 3.

TABLE 3

| Example No. | Salt used | Temperature [° C.] | Time [min] | Residual moisture after centrifuging [%] |
|---|---|---|---|---|
| 1c | — | — | 60 | 29.7 |
| 11 | $(NH_4)_2SO_4$ (33% strength) | 60 | 60 | 15.6 |
| 12 | $MgSO_4$ (20% strength) | 60 | 60 | 17.3 |

Examples 13 and 14 a) Preparation of ASA Graft Rubbers

These ASA graft rubbers were prepared by the process given in "Examples" in DE-A-40 11 163. DE-A-40 11 163 is expressly incorporated herein by way of reference in this respect.

This graft base was composed of 98 parts by weight of n-butyl acrylate and 2 parts by weight of an acrylate of tricyclodecenyl alcohol. The graft shell was formed from 75 parts by weight of styrene and 25 parts by weight of acrylonitrile.

b) Precipitation and Sintering of Graft Rubber

The graft rubber was precipitated and sintered as described above in Comparative Example 1 c) and d). Example 13 serves here as a comparative example without treatment with the solution of the invention, while an NaCl solution was used for treatment in Example 14. The results are given in Table 4 below.

TABLE 4

| Example No. | Salt used | Temperature [° C.] | Time [min] | Residual moisture after centrifuging [%] |
|---|---|---|---|---|
| 13c | — | — | — | 29.4 |
| 14 | NaCl (saturated) | 80 | 60 | 25.6 |

We claim:

1. A process for the drying of coagulated water-containing rubber particles, with the following steps
   (i) treatment of the coagulated water-containing rubber particles with an aqueous solution of substances selected from the group consisting of salts, alcohols, acids and sugars, except sodium hydroxide, sodium cyanide and sodium dithiocarbamate, in such a way that, at least for some period, the surface of the rubber particles becomes completely covered by the aqueous solution;
   (ii) where appropriate, washing of the particles with water;
   (iii) separating the particles by filtering or centrifuging.

2. A process as claimed in claim 1, wherein in step (i) the concentration of the aqueous solution is from 5% by weight to saturation, based in each case on the finished solution.

3. A process as claimed in claim 1, wherein step (i) is carried out at from about 20 to 200° C.

4. A process as claimed in claim 1, wherein the rubber particles, once they have been coagulated, are first sintered and then treated with the aqueous solution.

5. A process as claimed in claim 1, wherein step (i) is carried out continuously or batchwise.

6. A process as claimed in claim 5, wherein the rubber particles (5) are introduced into a vertically arranged tube (1), and the aqueous solution is added within the upper region of the tube (1), so that it passes through the tube (1).

7. A process as claimed in claim 6, wherein both the rubber particles (5) and the aqueous solution pass through the tube (1).

8. A process as claimed in claim 5, wherein the rubber particles (50) and the aqueous solution are introduced into an essentially horizontally arranged tube (10) and, by means of at least one conveying screw (60) are mixed and transported through the tube (10).

9. A process as claimed in claim 1, for the drying of graft rubber particles.

* * * * *